United States Patent

Urry

[11] Patent Number: 5,639,578
[45] Date of Patent: Jun. 17, 1997

[54] CURRENT COLLECTORS FOR ALKALINE CELLS

[75] Inventor: Lewis Frederick Urry, Elyria, Ohio

[73] Assignee: Eveready Battery Company, St. Louis, Mo.

[21] Appl. No.: 472,682

[22] Filed: Jun. 7, 1995

[51] Int. Cl.$^6$ .............. H01M 4/66; H01M 4/42
[52] U.S. Cl. .............. 429/229; 429/161; 429/165
[58] Field of Search .............. 429/161, 165, 429/211, 229

[56] References Cited

U.S. PATENT DOCUMENTS

| | | | |
|---|---|---|---|
| 2,606,298 | 7/1952 | Marsal | 429/165 |
| 4,939,048 | 7/1990 | Vignaud | 429/161 |
| 4,942,101 | 7/1990 | Audebert et al. | 429/165 |
| 5,424,145 | 6/1995 | Tomantschger et al. | 429/57 |

FOREIGN PATENT DOCUMENTS

| | | | |
|---|---|---|---|
| 59-155468 | 7/1984 | Japan | H01M 4/12 |
| 63-134368 | 6/1988 | Japan | H01M 4/06 |
| 63-134369 | 6/1988 | Japan | H01M 4/06 |

OTHER PUBLICATIONS

Koresch, edited by Linden, "Handbook of Batteries and Fuel Cells", McGraw–Hill, pp. 7.1–7.8 (no month) 1984.

Sax and Lewis, editors, "Hawley's Condensed Chemical Dictionary", pp. 166 and 734. (no month) 1987.

Primary Examiner—Prince Willis, Jr.
Assistant Examiner—Carol Chaney
Attorney, Agent, or Firm—Robert W. Welsh; Vivien Y. Tsang

[57] ABSTRACT

An electrochemical cell having an alkaline electrolyte, a cathode comprised of a metal oxide and a zinc anode and wherein the anode current collector of the cell is made from the same type zinc material forming the anode.

11 Claims, 2 Drawing Sheets

CURRENT COLLECTORS FOR ALKALINE CELLS

FIELD OF THE INVENTION

The invention relates to electrochemical cells having an alkaline electrolyte, a cathode comprised of a metal oxide, such as manganese dioxide, and a zinc anode and wherein said cells employ anode current collectors made from the same type of zinc material as the zinc anode.

BACKGROUND OF THE INVENTION

Alkaline cells are well known in the art and generally employ a zinc anode, a manganese dioxide cathode and an aqueous solution of potassium hydroxide for the electrolyte. These cells are readily available commercially for industrial and home applications. A detrimental characteristic of these cells is the formation of hydrogen gas. The gas can be formed by undesirable electrochemical reactions which occur at the surface of the anode current collector. As the quantity of gas increases, the internal pressure in the cell also increases and if not relieved, the cells could eventually leak. In order to reduce this gas buildup, mercury may be added to the anode. Unfortunately, as is well known, mercury may add to environmental pollution when cells are eventually discarded. To replace mercury, zinc corrosion inhibitors can be added to the zinc. Examples of these inhibitors include: lead, indium, cadmium, thallium, gold, silver, tin, gallium and compounds of these elements.

A deficiency found in some of the mercury-free alkaline cells is that unexpected depression occurs in the cells' voltage during discharge. These deviations are generally temporary and the voltage generally recovers to provide the normal electrical power to the customer. This type of temporary depression and then recovery in the voltage is referred to as a "dip". The term "dud" describes a cell whose closed circuit voltage drops below an established voltage cutoff and is considered a failure. Cells plagued by temporary or permanent premature drops in the closed circuit voltage, described above as dips and duds, generally include a brass collector that was not been properly plated with zinc during the cell assembly process and/or cells in which the zinc's particle-to-particle contact is inadequate.

Another problem with some mercury-free cells is that excessive gassing can develope in cells that have been partially discharged and then allowed to rest. This situation is referred to as "post partial discharge gassing" and generally occurs when the cell utilizes a brass current collector.

Japanese Patent Application No. 61-58163 relates to an alkaline zinc battery which is an alkaline battery in which zinc is used as the anode active substance characterized in that the anode is comprised of a low amalgam of a low amalgamation ratio of less that 2% by weight or a unamalgamated zinc alloy powder and in that at least the outermost layer of the face of the anode current collector facing the anode is formed in advance by a zinc alloy of a composition that is the same as or similar to the zinc alloy powder that forms the anode.

Japanese Patent Application No. 89-307160 relates to an alkaline cell that employs a negative electrode collector body, such as brass, that is coated with a zinc alloy.

Japanese Patent Application No. 89-307,161 relates to an alkaline cell which employs a negative electrode collector coated with indium and/or lead, and indium and/or lead substituted and deposited from aqueous solution on the surface of zinc powder as the negative electrode active material.

U.S. Pat. No. 4,939,048 relates to an electrochemical battery having an alkaline electrolyte and a gelled negative electrode containing zinc powder free from mercury, cadmium, and lead, and 1 ppm to 1000 ppm of at least one organic stabilizer compound selected from polyfluorine compounds of the ethoxyl fluoroalcohol type and compounds of the alcoyl sulfide and polyethoxyl alcohol type, the electrode being provided with a negative current collector immersed in the gell and connected to the negative terminal, wherein the current collector comprises a bundle of conducting fibers which are fixed together at their ends closest to the negative terminal, the fibers having a diameter lying in the range 0.05 mm to 1 mm, and being constituted, at least superficially, by a metal selected from: indium; gallium; cadmium; and pure zinc.

U.S. Pat. No. 4,942,101 relates to an electrochemical cell having an alkaline electrolyte and a gelled negative electrode containing zinc powder free from mercury, from cadmium, and from lead, and having 1 ppm to 1000 ppm of an organic stabilization compound selected from: polyfluoride compounds of the ethoxyl fluoroalcohol type; and compounds of the polyethoxyl alcohol and alcoyl sulfide type. The electrode is provided with a nail-shaped cylindrical negative current collector immersed in the gell and passing through a sealing plug and connected to the negative terminal. The current collector is constituted, at least superficially, by a substance selected from: pure zinc, pure cadmium, indium, and gallium; and the nail includes means assembled thereon without melting metal and serving to increase its developed surface area.

It is an object of the present invention to provide mercury-free alkaline cells that are effectively free from premature voltage depressions during discharge of the cells.

It is another object of the present invention to employ an alkaline cell with a current collector made of the same type of zinc material as the zinc material used as the anode so that unwanted voltage depressions can be effectively eliminated.

It is an object of the present invention to provide an alkaline cell with a zinc alloy anode and an anode current collector made entirely homogeneously of the same type of zinc alloy as the anode so that the amount of zinc alloy in the cell will be greater than a similar cell using a brass or other type of current collector, thus providing a greater amount of power output or capacity for the cell of the invention.

It is an object of the present invention to provide an alkaline cell with a current collector that will not form a gassing couple with the zinc alloy of the anode.

The above and further objects will become apparent upon consideration of the following description and drawings thereof.

SUMMARY OF THE INVENTION

The invention relates to an electrochemical cell having an alkaline electrolyte, an anode comprising a zinc component, and a cathode contained within a housing, having a first terminal of one polarity and a second terminal of opposite polarity and wherein a conductive current collector is extended into the housing to make electrical contact with the anode and provide electrical contact with one of the terminals of the housing, said conductive current collector made entirely and solely of a zinc material, preferably a zinc alloy. Preferably, the anode is comprised of a zinc alloy and the conductor current collector is made of the same type of zinc alloy as is the anode.

As used herein, the term, "made entirely and solely of a zinc material", is used to mean that at least the portion of the current collector inserted into the anode is entirely made of the zinc material.

Preferably, the zinc material should be a zinc alloy containing lead in an amount from about 0.04 wt. % to 0.1 wt. % and more preferably in an amount from about 0.05 wt. % to 0.08 wt. %. The weight of the zinc material forming the conductor current collector could comprise 5% to 50% of the weight of the zinc material in the anode, and preferably be from 15% to 20% of the weight of the zinc material in the anode. The volume percent zinc of the current collector should be greater than the volume percent percent zinc of the anode gel.

The teaching of the invention can be used to eliminate dips and duds in alkaline cells and reduce the quantity of gas generated in both undischarged cells and partially discharged cells. In accordance with the present invention, the anode current collector should be made entirely from the same material as the cell's electrochemically active material, such as zinc. Thus the current collector that protrudes into the anode is made from the same type zinc or zinc alloy that is used to make the anode's powder zinc which serves as one of the cell's electrochemically active materials. By manufacturing the powdered zinc and the current collector from the same zinc material, there is no electrochemical couple established in undischarged or partially discharged cells which could then lead to gassing within the cell. Another advantage of manufacturing the current collector with the same type of zinc material as the anode is that the current collector is able to serve as the cell's anode until adequate electrical contact is established between the current collector and the zinc particles and/or among the zinc particles. By maintaining adequate electrical contact from the zinc particles to the cell's anode current collector, dips and duds can be effectively eliminated in zero mercury type alkaline cells. The use of the same zinc material for both the current collector and the anode, will assure no additional chemical elements beyond that specified for the zinc material will be used. In addition, by using the same zinc material for both the anode and the current collector, it will permit a greater amount of zinc material in a fixed volume cell than a similar cell using a current collector made of a material different than the zinc material. The cell with the greater amount of zinc material could provide more power capacity since the current collector would be homogeneously made of the zinc material in the anode.

Examples of electrochemical cells suited for use with this invention are zinc/manganese dioxide, zinc/silver oxide, zinc/nickel oxide and zinc/air type cells. Preferably, cells of this invention are zero-added mercury alkaline cells comprising an alkaline electrolyte, a metal oxide such as manganese dioxide and a zinc anode. By "zero-added" is meant that no mercury is added to any of the cell components. Typically, a residual amount of mercury can be present in many natural products. Thus, for the preferred zero-added mercury cells of this invention the only amount of mercury present in the cell is the residual amount that is naturally present in the cell components. Thus, when the cells are disposed of, no additional amount of mercury is added to the environment that is greater than the amount that was present before the cells were assembled. For example, commercially available "pure zinc" cans contain about 20 parts of mercury per billion parts by weight of zinc, and often contain much less than 20 parts per billion. For the zero-added mercury cells of this invention, the amount of mercury present will preferably be less than the level that can be detected analytically. Typically, the amount is less than 10 parts per million by total weight of the cell preferably less than 5 parts per million, more preferably less than 2 parts per million, and most preferably less than 1 part per million.

As stated above, the current collector of this invention is entirely and homogeneously made from the same type of zinc material as is used in the anode. The current collector is generally an elongated member such as a blade, a flat stick or other shape member. The current collector could have a cross-sectional area shape selected from the group consisting of a square shape, rectangular shape, polygonal shape, annular shape and a star shape with three or more radial fins extending from the center. The current collector would be projected in the anode to provide good surface contact there between. Preferably, the current collector is solid while the anode is a gel that is plastic and displaceable so that the current collector can be easily inserted into the anode gel. This will enable the current collector to be easily projected into the anode. In another embodiment, the current collector is in the form of a tube with spaced apart annular segments, or any other arrangement, that provides a cavity which can be used for accommodating any gas formed by the anode and then directing the gas to a void space generally provided in the cell.

The electrochemical cells of the invention can comprise an alkaline electrolyte, a cathode and an anode arranged in a sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use. The cell construction can include a cupped metallic can, suitably constructed of steel or other metal and can be nickel plated in whole or in part. A tubular cathode containing the active cathode material, conductor, and in some cases, a binder, can be lined on the inner surface of the can, and a separator suitably made of a non-woven cellulosic or polymer fiber or microporous plastic, or cellophane film can be lined on the inner surface of the tubular cathode. In this construction, the can is in contact with the cathode and thus is the cathodic terminal.

An anode made of a mixture of active anode material, electrolyte, optionally an electrolyte swellable binder such as a polyacrylic acid can be enclosed with the separator. An anode current collector member is inserted into the anode. The cell is closed with a cover and sealed. The cover is in contact with the anode current collector member and is the anodic terminal of the cell. Any conventional seal can be employed. It is desired that the cell construction not have a venting means that would vent due to the normal pressure generated in the cell during a normal discharge.

The electrolyte used in this invention is an aqueous alkaline solution, such as potassium hydroxide or sodium hydroxide. The concentration of the solution can be any concentration that provides for ionic conductivity. Typically, in the assembled cell the concentration preferably ranges from about 30% to about 42%.

The cathode used in this invention is comprised of a metal oxide as the active cathode component. Examples include manganese dioxide and silver oxide. The preferred cathode comprises manganese dioxide, and more preferred is electrolytic manganese dioxide (EMD). (EMD, a widely available commercial product, is prepared by plating manganese dioxide from a manganese sulphate plating solution onto an electrode. The deposited manganese dioxide is subsequently removed from the electrode and recovered.

In addition to the metal oxide, the cathode further comprises a compound that is electrically conductive. This compound is called a conductor and of the many types of known conductors, synthetic or natural graphite, are preferably used in the cells of this invention synthetic and natural graphite are readily commercially available. One source is Lonza Ltd., a Swiss company. The cathode can further comprise a binder. Examples of suitable binders include polytetrafluoroethylene and polyethylene.

The cathodes comprise a major amount of the metal oxide, a conductive mount of the graphite and often an effective amount of binder. Typically, the metal oxide will comprise between about 80 to 85 weight percent of the total cathode weight. When a binder is employed, the binder will comprise less than about 5.0% by weight. The remainder of the cathode will be comprised of graphite and electrolyte solution. The amount of the electrolyte solution is sufficient to wet the dry components, and to provide a mixture that can be molded. The cathodes are prepared by mixing the components together and dispensing the mix into the container. The mix is then molded or compressed against the inside of the container, or premolded as rings and the rings pressed into the container.

Zinc is used as the active anode material in the cells of the invention. Preferably, the zinc is low gassing zinc, and is in powder form. The powdered zinc is combined with a binder, optional components, and an amount of the electrolyte solution to form a gel. The anode gel generally expands when it is discharged. The zinc material is the same type of zinc material that is used to make the anode current collector. A suitable zinc alloy would contain zinc and a minimum amount of lead.

The cells of this invention preferably employ additives that inhibit the corrosion of zinc. One beneficial component that can be added to the cell to inhibit the corrosion of zinc is an ethylene oxide polymer and derivatives thereof. Some examples of materials that can be added to the anode would include lead, indium, cadmium, bismuth, thallium, tin, aluminum, and compounds thereof. An indium-containing compound can be added to the anode mix as a zinc corrosion inhibitor. Suitable compounds include indium hydroxide, indium oxide, indium metal and the like.

DETAILED DESCRIPTION OF THE DRAWINGS

Figure 1:
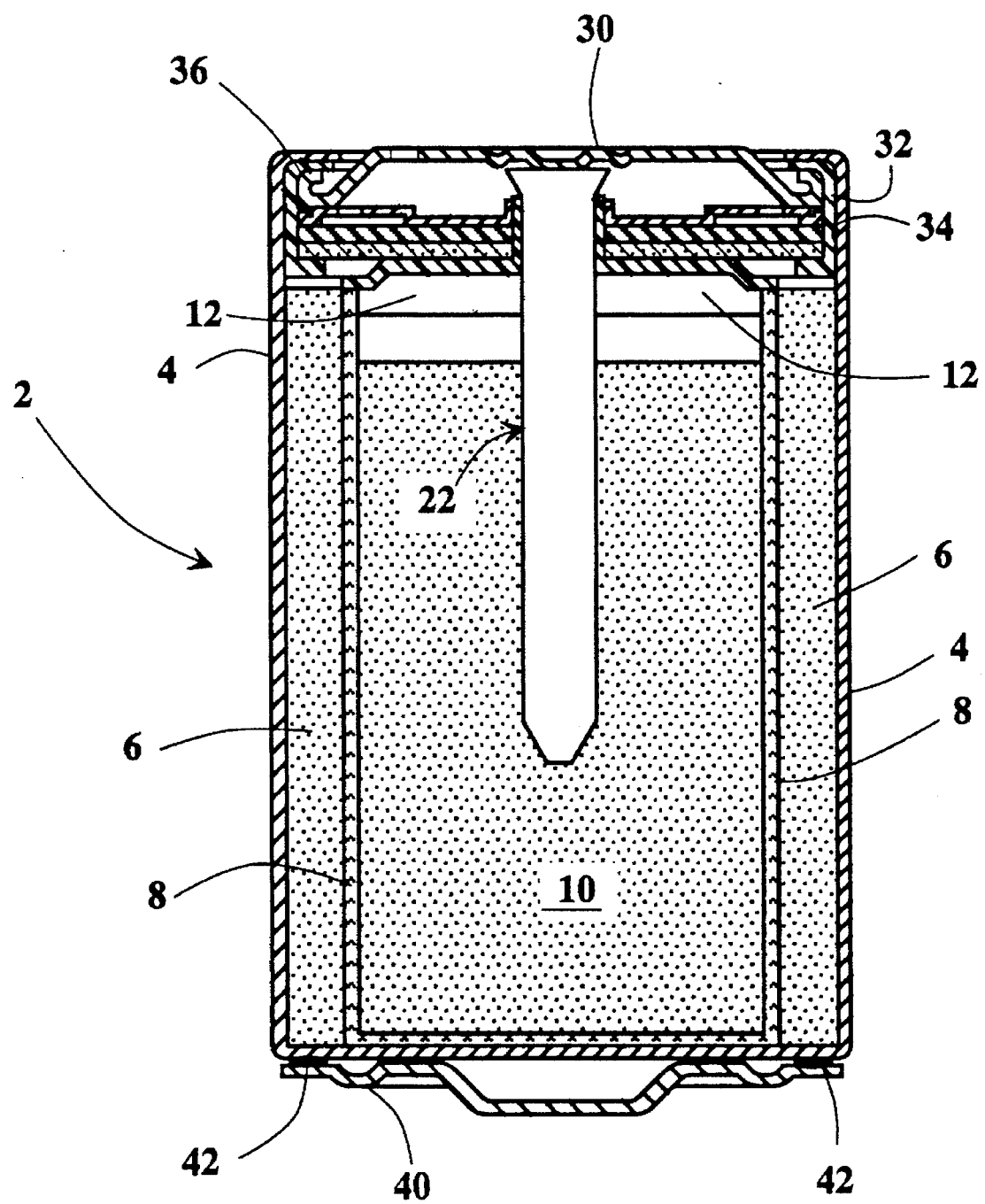
FIG. 1 is a cross-sectional view of an inverted alkaline cell of the present invention.

Referring to FIG. 1, the alkaline cell 2 is assembled in a conventional conductive steel container 4 which also forms an external terminal for the cell. The cathode 6 for cell 2 is a porous mixture of graphite, manganese dioxide, electrolyte and sometimes a binder.

After the cathode 6 is formed in the container 4 a separator 8 is added to physically isolate the anode material 10 from the cathode 6 and the container 4 while still permitting ion transport between the electrodes. The separator 8 could be made of two strips of separator material arranged perpendicular to one another and inserted into the cathode's tubular shape 6 forming a separator basket with a central opening. The anode mix 10 is then added to the separator lined cavity of the cell. An open area 12 is left in the cell to provide room for any expansion of the anode mix 10.

To complete assembly of the cell an external bottom cover 30 is placed into the steel container 4 and is also insulated from contact with the container 4 by the peripheral wall 32 of seal member 34. The bottom cover 30 makes electrical contacts with current collector 22, enabling the bottom cover 30 to become an external terminal for cell 2. The edge of the steel container 4 is rolled to hold the upturned portion 36 of the bottom cover 30 locked in position in the bottom of the cell 2. Top cover 40 can be fastened to the container by welds 42 after the cathode is reed into place.

Figure 2:
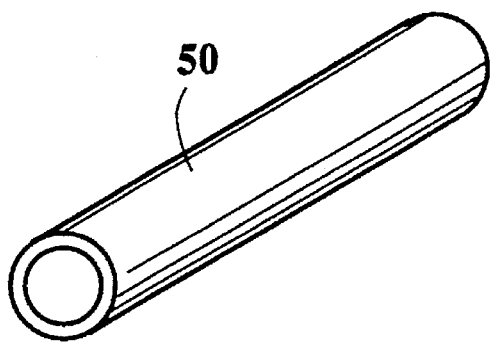
FIG. 2 is an isometric view of an anode current collector of this invention.
Figure 3:
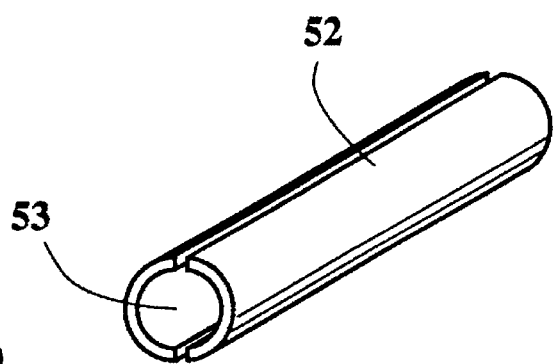
FIG. 3 is an isometric view of another anode current collector of this invention.
Figure 4:
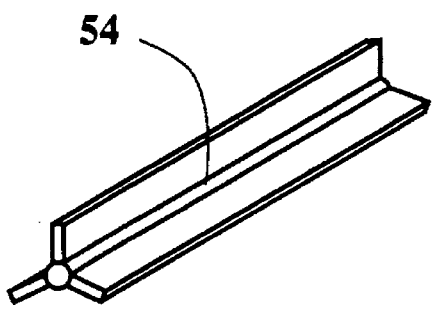
FIG. 4 is an isometric view of another anode current collector of this invention.
Figure 5:
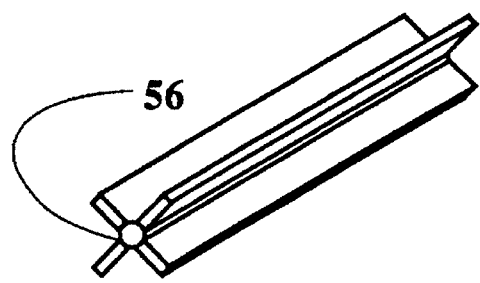
FIG. 5 is an isometric view of another anode current collector of this invention.

The anode current collector 22 shown in FIG. 1 is a rectangular blade or slat that is made entirely of the same type zinc material that is used to make the anode. FIG. 2 shows another embodiment of an anode current collector 50 formed in a shape of a cylinder. FIG. 3 shows an anode current collector 52 formed of two spaced apart annular segments defining a cavity 53. FIG. 4 shows an anode current collector 54 formed as a star cross-sectional shape member with three fins equally spaced and projected from the longitudinal axis of the current collector 54. FIG. 5 shows an anode current collector 56 formed as a star cross-sectional shape member with four fins equally spaced and projected from the longitudinal axis of the current collector 54.

Though the invention has been described with respect to preferred embodiments thereof, many variations and modifications will become apparent to those skilled in the art. It is therefore the intention that the appended claims be interpreted as broadly as possible in view of the prior art including all such variation and modifications.

What is claimed:

1. An electrochemical cell comprising an alkaline electrolyte, an anode comprising a zinc alloy, and a cathode contained within a housing having a first terminal of one polarity and a second terminal of opposite polarity and wherein an anode conductive current collector is extended into the housing making electrical contact with the anode and providing electrical contact with one of the terminals of the housing, said anode conductive current collector made entirely and homogeneously of the same composition of the zinc alloy as that in the anode.

2. The electrochemical cell of claim 1 wherein said anode conductive current collector is an elongated member.

3. The electrochemical cell of claim 2 wherein said anode conductive current collector has a cross-sectional area shape selected from the group consisting of a square shape, rectangular shape, polygonal shape, annular shape and star shape with three or more radial fins extending from the center axis.

4. The electrochemical cell of claim 1 wherein the zinc alloy in the anode contains at least one element selected from the group consisting of lead, indium, aluminum, bismuth, thallium, tin, and compounds thereof.

5. The electrochemical cell of claim 4 wherein the zinc alloy contains lead.

6. The electrochemical cell of claim 1 wherein the alkaline electrolyte is potassium hydroxide.

7. The electrochemical cell of claim 6 wherein the cathode contains manganese dioxide.

8. An electrochemical cell comprising an alkaline electrolyte, an anode comprising a zinc alloy, a cathode contained within a housing having a first terminal of one polarity and a second terminal of opposite polarity and wherein an anode conductive current collector is extended into the housing making electrical contact with the anode and providing electrical contact with one of the terminals of the housing, said anode conductive current collector made entirely and homogeneously of the same composition of zinc alloy as that in the anode, wherein the zinc alloy comprises from 0.05 wt % to 0.1 wt % lead.

9. The electrochemical cell of claim 8 wherein the zinc alloy in the anode contains at least one element selected from the group consisting of lead, indium, aluminum, bismuth, thallium, tin, aluminum, and compounds thereof.

10. The electrochemical cell of claim 9 wherein the anode conductive current collector has a cross-sectional area shape selected from the group consisting of a square shape, rectangular shape, polygonal shape, annular shape and star shape with three or more radial fins extending from the center axis.

11. The electrochemical cell of claim 8 wherein the anode conductive current collector has a cross-sectional area shape selected from the group consisting of a square shape, rectangular shape, polygonal shape, annular shape and star shape with three or more radial fins extending from the center axis.

* * * * *